Aug. 24, 1965　　　　　H. I. STANBACK　　　　　3,202,756
INSULATED BUS BARS AND ASSEMBLY
Filed April 2, 1963
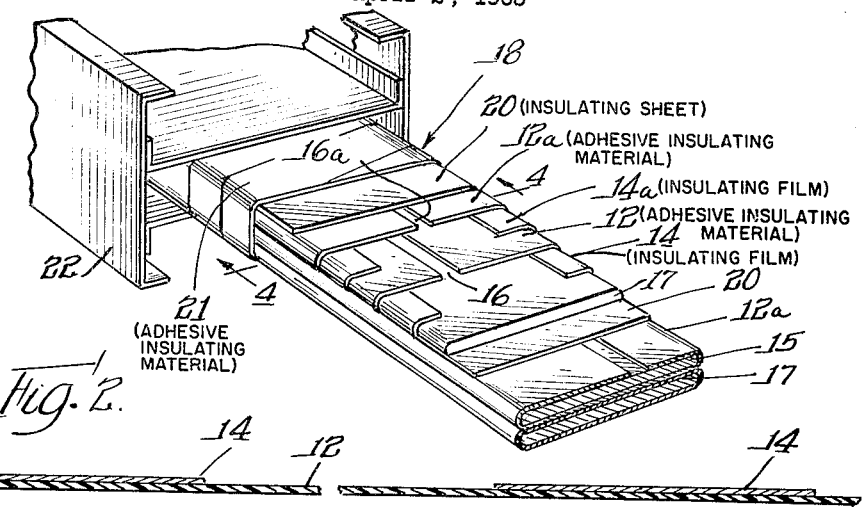
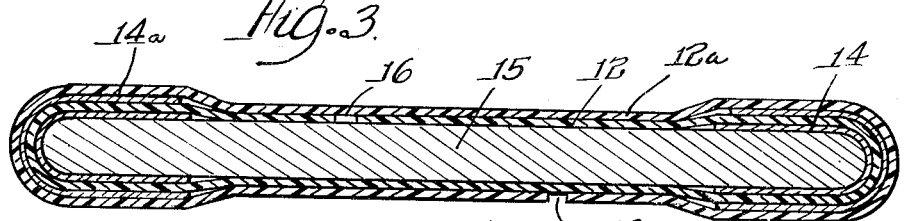
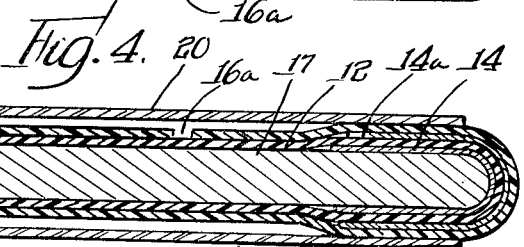
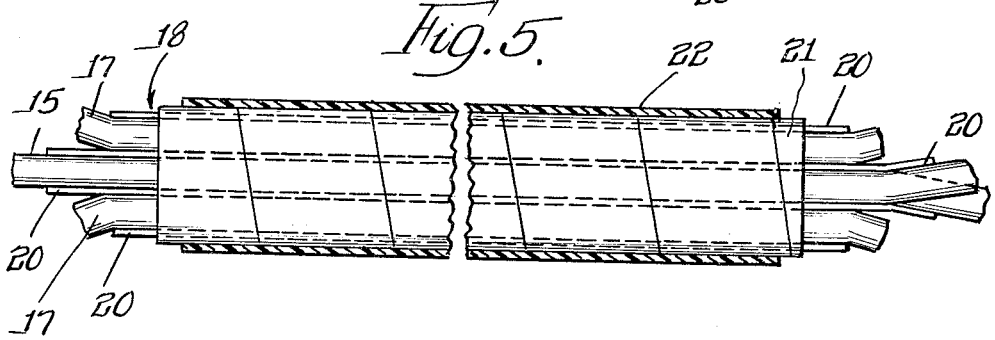
INVENTOR.
Harris I. Stanback
By: Paul J. Rose    Atty.

United States Patent Office 3,202,756
Patented Aug. 24, 1965

3,202,756
INSULATED BUS BARS AND ASSEMBLY
Harris I. Stanback, Lexington, Ky., assignor to Square D Company, Park Ridge, Ill., a corporation of Michigan
Filed Apr. 2, 1963, Ser. No. 269,970
12 Claims. (Cl. 174—99)

This invention relates generally to bus bar assemblies, and more particularly to a method of insulating bus bars in a bus duct structure.

For compactness and low reactance, it is desirable to position the bus bars of a bus duct structure extremely close to each other, but the closer to each other they are arranged, the more difficult it is to adequately electrically insulate them from each other.

An object of the present invention is to provide an improved bus duct structure in which the bus bars are arranged closer to each other than formerly.

Another object is to provide improved insulation for the bus bars of a bus duct.

A further object is to provide a compact bus duct structure in which the bus bars are arranged closer to each other than formerly and yet the bus duct has improved heat dissipating ability.

A still further object is to provide an improved method of applying insulation separately to flat bus bars of a bus duct, particularly with respect to opposite edge portions of the bus bars.

Yet another object is to provide the bus bars of a bus duct with insulation equivalent in insulating properties to films of polyester material wrapped completely around the respective bus bars without actually wrapping films of the difficult-to-form polyester material completely around the respective bus bars.

An additional object of the invention is to provide improved double insulation for the bus bars of a bus duct including alternate layers of two dissimilar insulating materials.

Other objects will appear when the following specification is considered along with the accompanying drawings in which:

FIGURE 1 is a perspective view of a portion of a bus duct structure constructed in accordance with this invention, parts thereof being progressively cut away lengthwise of the bus bars to better illustrate the insulation arrangement of the bus bar assembly;

FIGURE 2 is a fragmentary broken cross sectional view of a layer of insulation before it is applied to a bus bar in accordance with this invention;

FIGURE 3 is a cross sectional view of a bus bar having insulation applied thereto in accordance with this invention;

FIGURE 4 is a cross sectional view of a bus bar having insulation applied thereto in an alternate manner in accordance with this invention; and FIGURE 5 is a fragmentary edge view of a bus bar assembly constructed in accordance with this invention.

In FIGURE 2 a fragmentary broken cross sectional view of a strip 12 of adhesive varnished glass cloth is shown and may be thought of as extending lengthwise perpendicularly to the plane of the paper. A pair of parallel spaced strips 14 of polyester film, a strong and durable material having a relatively high dielectric strength and through which heat can be directly dissipated without substantially reducing the dielectric strength, are placed in position on the adhesive side of the strip 12 of varnished glass cloth.

The strip 12 with the two polyester film strips 14 thereon is applied to and wrapped substantially once around a flat bus bar as shown on a bus bar 15 in FIGURE 3 and on a bus bar 17 in FIGURE 4, the strips 14 respectively being formed substantially symmetrically around the opposite edge portions of the bus bar and the width of the strip 12 being such that a small gap 16 occurs between the opposite edges of the strip 12. Preferably a second strip 12a of adhesive varnished glass cloth with two parallel spaced strips 14a of polyester film thereon is then applied to and wrapped substantially once around the bus bar over the first strip 12, the strips 14a also respectively being formed substantially symmetrically around the opposite edge portions of the bus bar over the strip 12 and strips 14 and the width of the strip 12a being such that a small gap 16a occurs between the opposite edges of the strip 12a. The strips 12 and 12a may be applied from opposite sides of the bus bar, as shown on the bus bar 15 in FIGURE 3, or they may be applied from the same side of the bus bar, as shown on the bus bar 17 in FIGURE 4. The spacing of the strips 14a with respect to the opposite edges of a strip 12a is different from the spacing of the strips 14 with respect to the opposite edges of a strip 12, and thus the gaps 16 and 16a are spaced apart so as not to be aligned on the bus bar 17.

An exemplary bus bar assembly 18 using two of the insulated bus bars 17 and one of the insulated bus bars 15 is shown in FIGURES 1 and 5. Sheets of insulation 20, preferably of polyester material, are placed respectively between the bus bars and on the outer sides of the outer bus bars. The opposite edge portions of the sheets of insulation 20 overlap the strips 14 and 14a, thus providing insulation equivalent to films of polyester material wrapped completely around the respective bus bars. The individually wrapped bus bars and sheets of insulation 20 together are helically wound with epoxy impregnated glass cloth 21 to form the bus bar assembly 18. The bus bar assembly may then be adhesively secured within a housing 22 in intimate contact with the inner surfaces of one pair of opposed sidewall portions and in spaced relation to a second pair of opposed sidewall portions of the housing, as shown in FIGURES 1 and 5.

The gaps 16 and 16a are provided to eliminate overlapping of the opposite edges of the respective strips 12 and 12a. High spots are thus prevented and the wrappped bus bars 15 and 17 may be placed in intimate contact with the polyester sheets 20, air being entrapped substantially only at the gaps 16 and 16a. Good heat transfer to the housing 22 is thus assured. It should be noted that a large amount of air appears to be entrapped between the sheets 20 and the wrapped bus bar 17 in FIGURE 4. This is not so in an actual bus bar assembly constructed in accordance with the invention, but only appears so due to limitations of drawing. In actual practice, the strips of polyester film 14 and 14a may be as thin as two thousandths of an inch, the strips of varnished glass cloth 12 and 12a may be as thin as one hundredth of an inch, and the polyester sheets 20 may be as thin as one hundredth of an inch.

In the wrapping of the individual bus bars, adhesive could be applied to the polyester film strips 14 and 14a and the strips 14 and 14a could be applied separately to the bus bars. However, the strips 14 and 14a are preferably first applied to the strips 12 and 12a, respectively, in the manner described, and the strips 12 and 12a with the strips 14 and 14a thereon then applied to the bus bars.

It will thus be seen that an extremely compact bus bar assembly having low reactance, adequate electrical insulation, and low heat rise characteristics has been provided. Various modifications may be made in the structure and method of construction disclosed without departing from the spirit and scope of the invention.

I claim:
1. An individually wrapped bus bar for use in an assembly of bus bars, comprising
   (a) a flat elongated bus bar,
   (b) a pair of elongated non-self-conforming strips of insulating film wrapped respectively over opposite longitudinal edge faces of said bus bar and the portions on opposite sides thereof adjacent said longitudinal edge faces, and
   (c) an elongated strip of adhesive insulating material of a width approximately equal to but no greater than the periphery of said bus bar, said strip of adhesive insulating material being wrapped only once substantially around said bus bar and the strips of insulating film thereon and conforming said strips of insulating film to said bus bar.

2. An individually wrapped bus bar as claimed in claim 1, wherein said insulating film strips are formed of a polyester material.

3. An individually wrapped bus bar as claimed in claim 1, wherein said strip of adhesive insulating material is formed of varnished glass cloth.

4. An individually wrapped bus for use in an assembly of bus bars, comprising
   (a) a flat elongated bus bar,
   (b) a first pair of elongated non-self-conforming strips of insulating film wrapped respectively over opposite longitudinal edge faces of said bus bar and the portions on opposite sides thereof adjacent said longitudinal edge faces,
   (c) a first elongated strip of adhesive insulating material of a width approximately equal to but no greater than the periphery of said bus bar, said first strip of adhesive insulating material being wrapped only once substantially around said bus bar and said first pair of insulating film strips and conforming said first pair of insulating film strips to said bus bar,
   (d) a second pair of elongated non-self conforming strips of insulating film wrapped respectively over said opposite longitudinal edge faces of said bus bar and the portions on opposite sides thereof adjacent said longitudinal edge faces and also over said first pair of insulating film strips and said first strip of adhesive insulating material, and
   (e) a second elongated strip of adhesive insulating material of a width approximately equal to but no greater than the periphery of said bus bar, said second strip of adhesive insulating material being wrapped only once substantially around said bus bar over said first strip of adhesive insulating material and said first and second pairs of insulating film strips and conforming said second pair of insulating film strips to said bus bar.

5. An individually wrapped bus bar as claimed in claim 4, wherein said insulating film strips formed of a polyester material.

6. An assembly of bus bars comprising
   (a) a plurality of flat elongated bus bars in flatwise stacked relationship,
   (b) a plurality of pairs of elongated non-self-conforming strips of insulating film, each of said bus bars having a pair of said insulating film strips wrapped respectively over opposite longitudinal edge faces of the bus bar and the portions on opposite sides thereof adjacent said longitudinal edge faces,
   (c) a plurality of elongated strips of adhesive insulating material wrapped respectively only once substantially around said bus bars and the pairs of insulating film strips thereon and conforming said pairs of insulating film strips respectively to said bus bars, and
   (d) a plurality of elongated insulating sheets respectively between adjacent bus bars and on the outer sides of the two outer bus bars in overlapping relationship with said insulating film strips.

7. An assembly of bus bars as claimed in claim 6, wherein said strips of adhesive insulating material are formed of varnished glass cloth.

8. An assembly of bus bars as claimed in claim 6, wherein said insulating film strips are formed of a polyester material.

9. An assembly of bus bars as claimed in claim 6, wherein said insulating sheets are formed of a polyester material.

10. An assembly of bus bars as claimed in claim 6, including a flexible insulating material wrapped helically arround said wrapped bus bars and insulating sheets collectively.

11. An assembly of bus bars as claimed in claim 10, wherein said flexible insulating material wrapped helically around said wrapped bus bars and insulating sheets collectively is formed of epoxy impregnated glass cloth.

12. A bus duct including an assembly of bus bars as claimed in claim 10, and an elongated hollow housing therefor, said housing having a rectangular aperture extending therethrough, and said assembly of bus bars being disposed in said rectangular aperture in contact flatwise of said bus bars with the inner surfaces of a first pair of opposed sidewall portions of said housing and spaced edgewise of said bus bars from a second pair of opposed sidewall portions of said housing.

References Cited by the Examiner

UNITED STATES PATENTS

| 2,220,776 | 5/40 | Hoover | 156—55 |
| 2,544,503 | 3/51 | Kennedy | 156—55 |
| 2,675,421 | 4/54 | Dexter | 174—117 |
| 2,707,204 | 4/55 | Richardson et al. | 174—100 |
| 2,789,155 | 4/57 | Marshall et al. | 174—110 X |
| 2,888,511 | 5/59 | Guritz | 174—117 |
| 2,966,542 | 12/60 | Shields | 174—99 X |

OTHER REFERENCES

German printed application 1,128,900, May 3, 1962.
Starr "Corona Properties of Insulating Materials," Electrical Engineering, June 1956, Table II.

LARAMIE E. ASKIN, *Primary Examiner.*
JOHN P. WILDMAN, JOHN F. BURNS, *Examiners.*